United States Patent [19]

Boardman et al.

[11] Patent Number: 5,652,469
[45] Date of Patent: Jul. 29, 1997

[54] REVERSE FLOW VENTILATION SYSTEM WITH STATOR CORE CENTER DISCHARGE DUCT AND/OR END REGION COOLING SYSTEM

[75] Inventors: William H. Boardman, Burnt Hills; Alexander G. Beckford; Emil D. Jarczynski, both of Scotia, all of N.Y.; Robert G. Hamilton, Georgetown, Mass.

[73] Assignee: General Electric Company, Schenectady, N.Y.

[21] Appl. No.: 260,845

[22] Filed: Jun. 16, 1994

[51] Int. Cl.⁶ .................... H02K 9/00; H02K 9/12
[52] U.S. Cl. ........................... 310/58; 310/59
[58] Field of Search ............... 310/52, 58, 64, 310/65, 59, 256, 260

[56] References Cited

U.S. PATENT DOCUMENTS

| | | | |
|---|---|---|---|
| 1,196,345 | 8/1916 | Field | 310/65 |
| 1,522,027 | 1/1925 | Parsons et al. | 310/58 |
| 2,887,593 | 5/1959 | Weidemann | 310/58 |
| 3,497,737 | 2/1970 | Philofsky | 310/54 |
| 3,675,056 | 7/1972 | Lenz | 310/54 |
| 3,739,208 | 6/1973 | Shartrand | 310/58 |
| 4,442,371 | 4/1984 | Utsunomiya et al. | 310/260 |
| 4,465,947 | 8/1984 | Armor | 310/59 |

FOREIGN PATENT DOCUMENTS

| | | | |
|---|---|---|---|
| 2252733 | 6/1973 | Germany. | |
| 3242018 A1 | 6/1983 | Germany. | |
| 55-94560 | 7/1980 | Japan | 310/58 |
| 57-40343 | 3/1982 | Japan | 310/58 |
| 344775 | 4/1960 | Switzerland | 310/64 |
| 474892 | 8/1969 | Switzerland | 310/58 |
| 1171-908-A | 8/1985 | U.S.S.R.. | |
| 509359 | 8/1939 | United Kingdom. | |

*Primary Examiner*—Clayton E. Laballe
*Attorney, Agent, or Firm*—Nixon & Vanderhye

[57] ABSTRACT

A rotating electrical machine with a reverse flow ventilation system is constructed with one or more discharge ducts at the center of the stator core to reduce the air gap pressure and promote more uniform cooling. In a second embodiment, discharge ducts are provided axially displaced from the center line of the core. In another embodiment, end region cooling of the conductor bars is enhanced by a series-parallel flow path constructed with the use of baffles and an apertured plate. In a final embodiment, both stator core center discharge ducts and series-parallel flow end region cooling are incorporated in the same machine.

10 Claims, 4 Drawing Sheets

REVERSE FLOW VENTILATION SYSTEM WITH STATOR CORE CENTER DISCHARGE DUCT AND/OR END REGION COOLING SYSTEM

TECHNICAL FIELD

The invention relates to rotating electrical machines with a reverse flow ventilation system.

BACKGROUND

Reverse flow cooling in rotating electrical machines delivers cold gas simultaneously to both the stator and the rotor by providing parallel inlet paths to the stator core and the rotor entrance. As illustrated in the application drawings, cold gas flows from a cooler into the region in back of the stator core, which may contain baffles to control the air flow through the stator core, and into the air gap. Cold gas also flows from the cooler into the ends of the rotor, and, generally through cooling gas subslots and radially outwardly through gas flow passages in the rotor slots, to the air gap. A fan attached to the rotor circulates the exhaust gas from the air gap back to the cooler. The discharge of the cooling flow is into the air gap and out the annular exits at the ends of the air gap. At the stator end regions, the cooling gas flowpath is past the core end, flange, flux shield if used, endturns and to the fan entrance. Air and hydrogen are commonly used as the cooling gas.

Previous machines with reverse flow ventilation were large hydrogen generators with large air gaps between the rotor and the stator. The large air gap helped to alleviate the pressure gradient along the air gap. Moreover, the flow distribution through the core is less than uniform, only being controlled by baffling at the back of the core which added to the machine flow resistance. The rotor fans were of the axial setout type, and the fan performance was increased by twisted preturning vanes. However, preturning vanes add to the expense and complexity of the machine.

The ventilation system for a reverse flow generator with a narrow air gap inherently has a high pressure drop in the air gap between the rotor and the stator core. Analysis of these machines indicated a hot spot at the axial center line of the machine. Larger and longer machines lead to even higher pressures. This is because reverse flow ventilation discharges both the rotor and stator cooling flow into the air gap and all the gas must exit the limited annular area at the ends of the gap between the retaining ring and the stator core end iron. The high pressure drop in the air gap requires higher fan performance to maintain adequate stator core flows. This results in increased fan windage losses and lower machine efficiency. In addition the large air gap pressure drop causes a lack of stator cooling flow at the center of the generator. This is where the air gap pressure is the highest and the differential pressure across the core is the lowest.

The heat generating components at the stator end region include the end packets, the flange, conductor bars, and the electrical connections and buswork that lead to the machine terminals. A flux shield, when used, constitutes another heat generating component. With a fixed pressure head to drive the flow, if the end region components are cooled entirely with parallel flowstreams, the flow volume is maximized, resulting in increased flow losses and decreased machine efficiency. If all the components are cooled in series, the downstream components will be significantly hotter than those upstream and result in a system that generally requires an increased pressure head and has decreased machine efficiency.

DISCLOSURE OF THE INVENTION

The invention provides for the exhausting of a portion of the cooling gas in the air gap of a rotating electrical machine, e.g., generator, radially outwardly through one or more core ducts in the stator core. The core duct(s) lead to an annular plenum in back of the core and then to axially disposed discharge pipes which open into a region adjacent the end windings of the machine. The core discharge duct(s) improves the machine ventilation system in that it permits the use of a smaller fan which lowers fan windage losses and increases the generator efficiency. It also reduces the air gap axial pressure gradient and permits more uniform cooling of the stator core.

The invention also provides for a stator end cooling system that effectively delivers and distributes cooling gas to all the heat generating components while providing uniform temperature within specified limits, requires minimum gas flow and requires minimum pressure head. This is accomplished by directing the cooling flow at the stator end region in a series-parallel path, where the series flowstream cools several components sequentially and a parallel path of cooler gas enters the stream at a point downstream of the series cooled components.

The use of stator core center duct cooling and series-parallel stator end region cooling in combination provides for a uniform operating temperature for the machine.

BEST MODE FOR CARRYING OUT THE INVENTION

Figure 1:
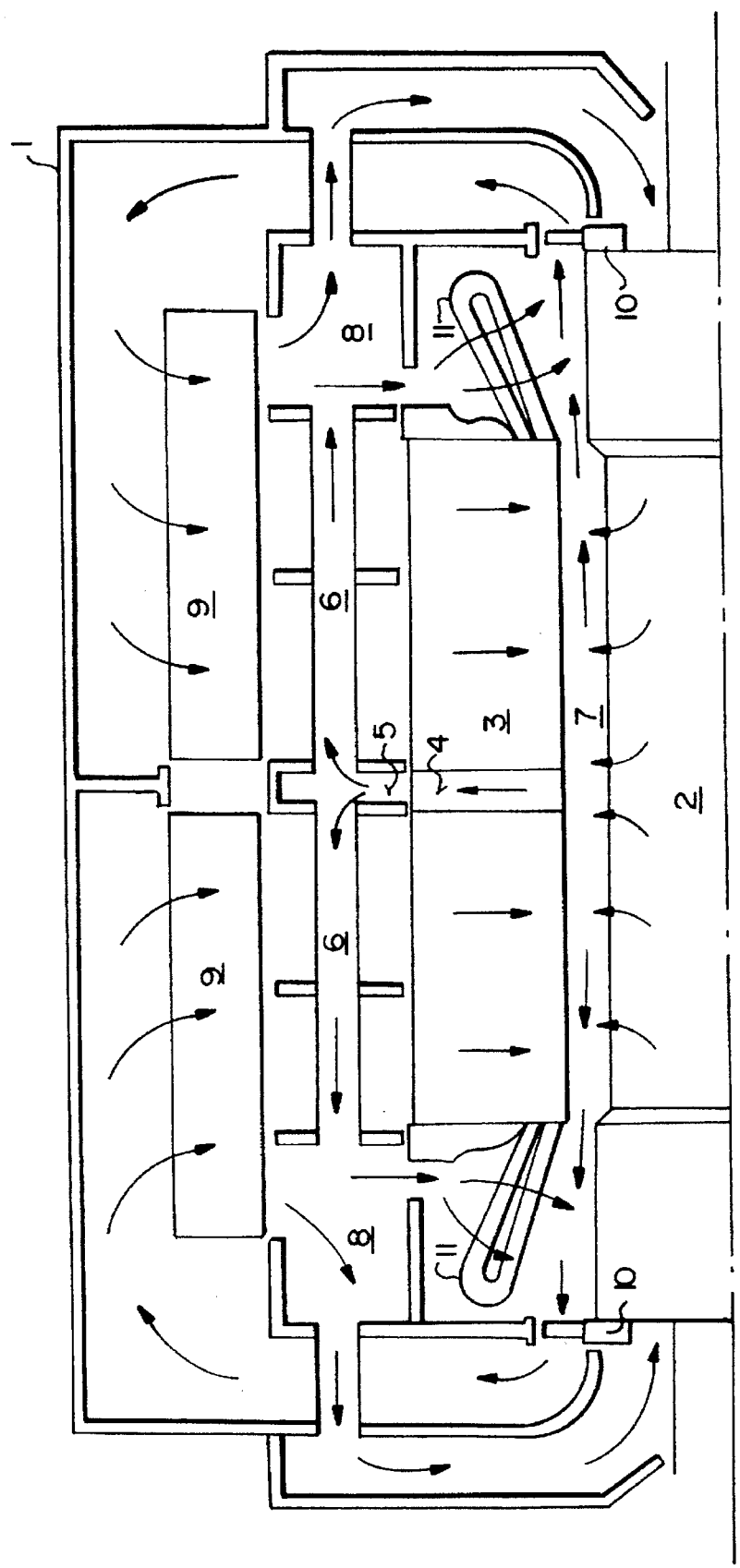
FIG. 1 shows a reverse flow ventilation system with a center discharge duct in the stator core.

In FIG. 1 machine 1 with a reverse flow ventilation system is illustrated. The machine has a rotor 2, air gap 7, stator core 3, end windings 11, cooler 9 and rotor fan 10. The stator core 3 is provided with one or more center ducts 4 extending from air gap 7 to a plenum 5. The plenum 5 is in back of the stator core and is isolated from the core inlet flow sections. Pipes 6 extend axially from each side of the plenum and open into a region 8 adjacent the end windings 11. In the regions 8 the exhaust gas mixes with a controlled quantity of cold gas flowing from the cooler 9.

Figure 2:
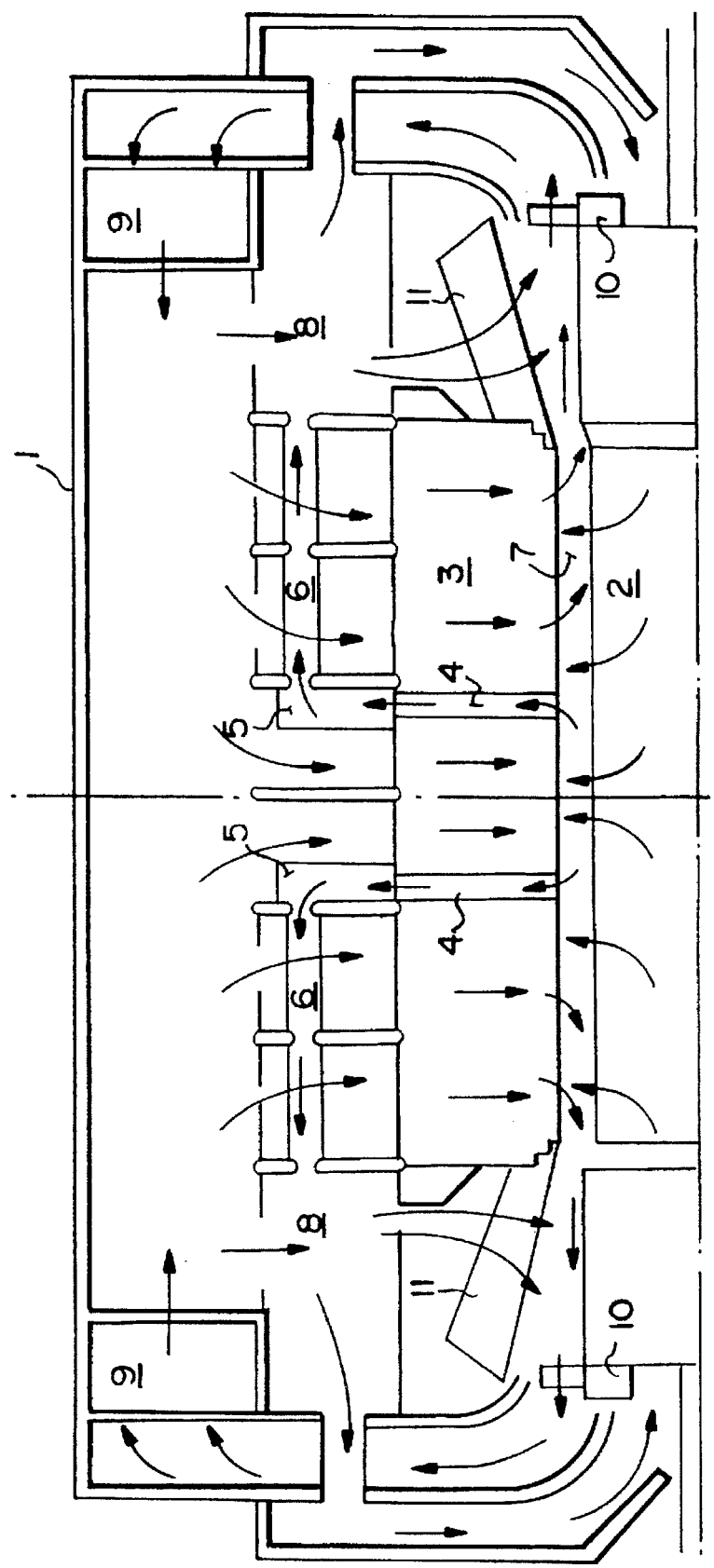
FIG. 2 shows a reverse flow ventilation system with two discharge ducts straddling the center line of the stator core.

In the FIG. 2 embodiment two or more discharge ducts 4 are disposed in core 3. The discharge ducts are located on the opposite side of the axial center line. More than one discharge duct may be located in the plane perpendicular to the axis of the machine. The remaining components in FIG. 2 are the same as in FIG. 1 and are similarly identified. Additional axially displaced ducts may be employed.

In both the FIG. 1 and FIG. 2 embodiments, the gas in the air gap is directed radially outwardly through the duct(s) to a plenum, piped axially to the region 8 and discharged into a cold air stream coming from the cooler 9. This construction lowers the air pressure in the gap 7 between the rotor and the stator core and lowers the pressure drop.

The lower air pressure and pressure drop in the gap reduces the machine resistance and lowers the fan pressure head required to achieve the same cooling flow. Preturning vanes can be avoided due to the reduced machine flow resistance. A smaller fan can be used which lowers the fan windage losses. Due to the reduced air gap axial pressure gradient from the center of the machine to the air gap exit, flow through the core center duct(s) is promoted and more uniform cooling of the stator core results.

Figure 3:
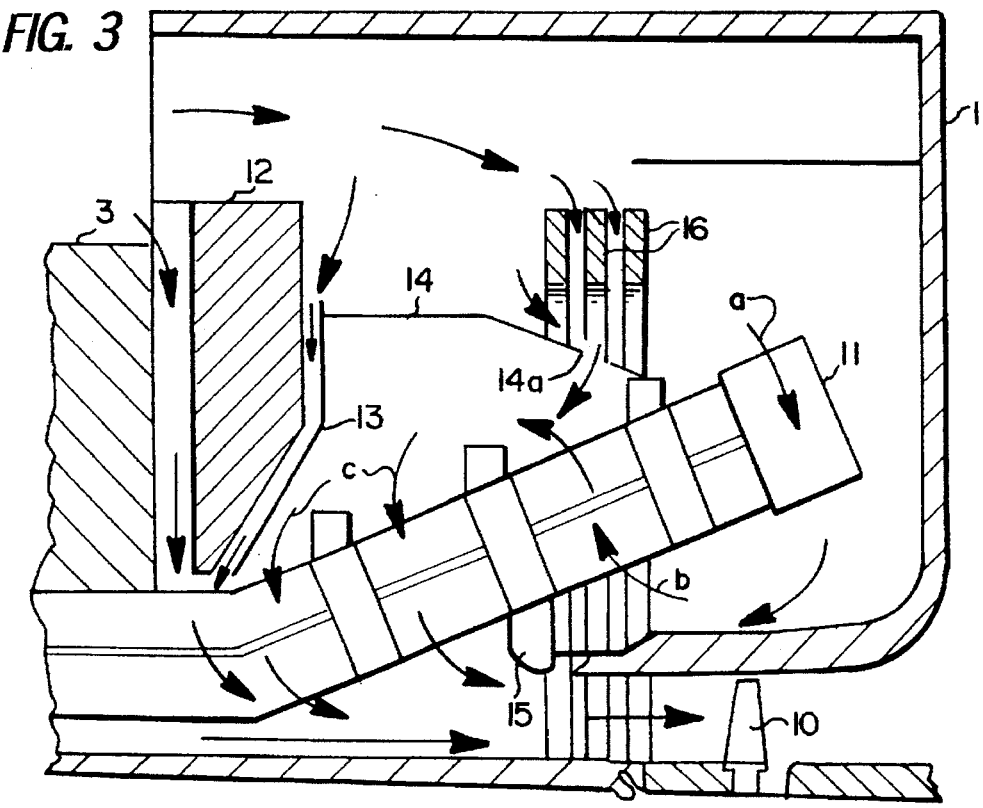
FIG. 3 shows series-parallel cooling of the end region of a stator core.

In FIG. 3, the stator core end region is shown as comprising the conductor bars or endturns 11, a flange 12, a flux shield 13, plate 14, baffles 15 and circuit rings 16. Also illustrated in FIG. 3 are the flow paths of the cooling gas. The cooling gas is initially directed in parallel paths past several heat generating components. These parallel paths are disposed between the end of the stator core 3 and the flange 12, between the flange 12 and the flux shield 13, between the circuit rings 16 and the electrical connections (not shown), and through the extreme outer ends of the conductor bars 11. The first two flowpaths on either side of the flange 12 are individually regulated by the size, length and area, of the ducts presented. These two parallel flowpaths continue through sections of the stator conductor bars and to the reverse flow rotor fan 10.

In a third parallel path, gas flows over the circuit rings 16 and electrical connections and divides into two portions. A first portion, shown by arrow a, becomes a series flow, cooling the outermost section of the conductor bars 11, and then reenters and cools the next most outer section, shown by arrow b, of conductor bars 11. A second portion enters through apertures 14a in plate 14 and joins with the first portion where the combined first and second portions flow through a third section, shown by arrows c, of conductor bars and to the reverse flow fan 10. The flow paths of the first and second portions are controlled by the baffle 15 and the configuration of the conductor bars 11. The size of the apertures 14a in plate 14 controls the amount of second portion cooling gas mixed with the first portion cooling gas flowing through the outermost section of the conductor bars.

In the third parallel path, the first cooling gas portion flows in series through the conductor bar sections, and at the point of mixing with the second portion has attained a significant increase in temperature vis-a-vis the second portion which has only flowed past the circuit rings. The injection and mixing at this point of the relatively cooler second portion with the first portion provides for lower temperature cooling gas with increased velocity for cooling the downstream conductor bar sections. This arrangement of dividing the cooling gas into series and parallel flow branches and recombining and mixing the cold gas with the heated series path gas allows the cooling flow rate and temperature for each of the heat generating components to be regulated.

Construction of the third parallel path to flow cooling gas over the circuit rings and electrical phase connections enhances their cooling. The apertures in plate 14 located approximately beneath the circuit rings 16 increase flow of the cooling gas between the circuit rings 16. It is noted, however, that at the opposite end of the machine there are no circuit rings or electrical phase connections, and therefore there is little preheating of the cooling gas prior to dividing into first and second portions.

Reverse flow machines that do not use stationary guide vanes must provide a smooth airflow entrance upstream of the reverse flow fan. The flow distribution and pressure head requirements are optimized by the arrangement shown in FIG. 3 through the provision of a sheltered and gradual discharge zone for the end flow. Discharging the end flow through the angled stator conductor bars 11 well upstream of the reverse flow fan 10 promotes a gradual recombination of the end region flow as it joins the main stator core and rotor flows. This further reduces flow losses and pump requirements.

In machines with fans axially outboard of the stator bars and parallel once through cooling flow, the length of the machine provided ample space for mounting stationary guide vanes to control the distribution and direction of the flow at the fan entrance. In constructions where the reverse flow fans are axially inboard of the stator endturns, once through parallel cooling is not effective and simple multi-pass series flow is not efficient. However, the series-parallel flow distribution described hereinabove is particularly effective in constructions where the fans 10 are axially inboard of stator endturns 11.

Figure 4:
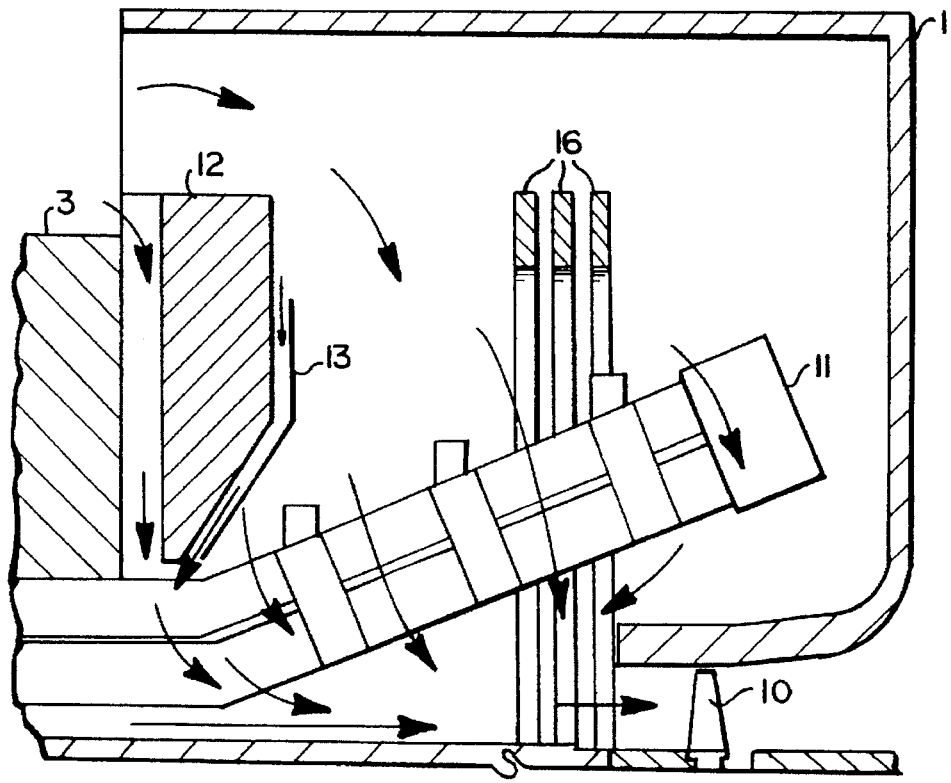
FIG. 4 shows parallel cooling of the stator core end region.
Figure 5:
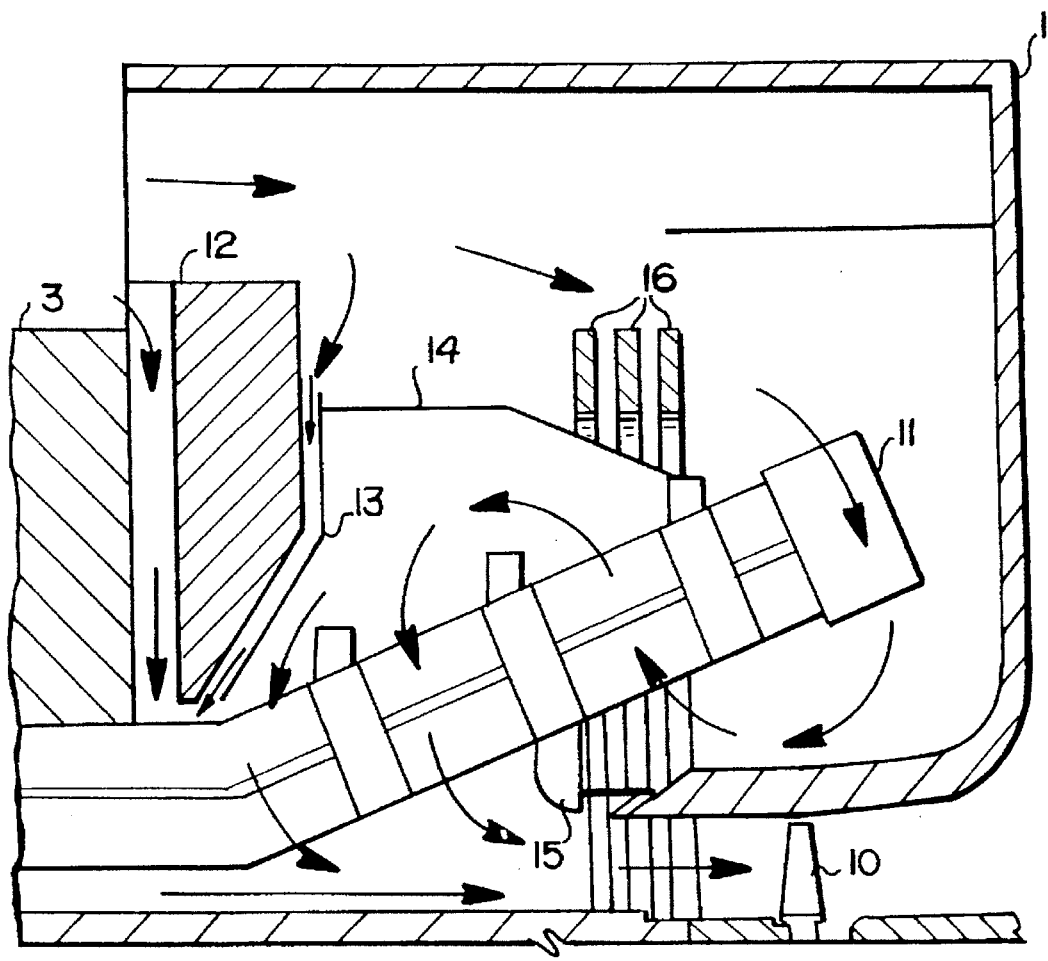
FIG. 5 shows series cooling of the stator core end region.

FIG. 4 showing only parallel cooling at the stator end region and FIG. 5 showing only series cooling at the stator end region are cooling configurations illustrated for comparing with the novel series-parallel cooling of FIG. 3. In FIG. 4 all the cooling gas for the conductor bars flows through parallel paths. With the inner air shield extending inboard of the stator conductor bars, because of the axially inboard position of the fan, the outermost sections of the stator conductor bars do not receive sufficient cooling. In the simple series cooling gas flow path of FIG. 5, all the cooling gas flow is forced to flow through the conductor bars. This requires significantly higher head pressure to drive the flow volume and, hence, a fan with greater pumping capacity. Otherwise, the downstream conductor bars may become significantly hotter, resulting in elevated and nonuniform operating temperatures, which can lead to degradation of the electrical insulation or loosening of parts due to uneven thermal expansion.

Reverse flow machines with center core cooling as in FIGS. 1 and 2 discharge some of the hot gas from the central core section into the stator end region. Additional cold gas is introduced and premixed with the hot gas providing for some increase in the end cooling flow. With reverse flow cooling fans set axially inboard of the stator conductor bars, the series-parallel stator end region cooling is more effective than once through parallel cooling and more efficient than series flow cooling.

The center discharge ventilation system and variations thereof enable reverse flow cooling to work for larger machines with longer and more narrow air gaps. In smaller machines the ventilation scheme reduces windage losses and increases machine efficiency.

The series-parallel flow path configuration at the stator end provides uniform operating temperature of components in the end region, minimizes the cooling flow volume, reduces pumping power, optimizes the pressure head, provides a general and gradual recombination of the flow upstream of the reverse fan entrance and increases the overall machine efficiency.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A rotating electrical machine comprising,
   a stator and a rotor,
   a reverse flow cooling system, and a stator end region cooling subsystem with a series-parallel cooling gas flow path through stator end region components, wherein said stator end region components include conductor bar sections with baffles coupled thereto for directing a cooling gas through said conductor bar sections, and an apertured plate for splitting the cooling gas into a first portion directed by said baffles in a series path through said conductor bar sections and a second portion passing through said aperture for mixing with said first portion at a point downstream in said conductor bar sections.

2. A rotating electrical machine as in claim 1 further comprising a flange located at and spaced from the end of said stator to form a first cooling duct therebetween.

3. A rotating electrical machine as in claim 2 further comprising a flux shield disposed adjacent to but spaced from said flange to form a second cooling duct parallel to said first cooling duct.

4. A rotating electrical machine as in claim 1 further comprising a reverse flow fan located axially inboard with respect to said conductor bars.

5. A rotating electrical machine as in claim 4 wherein the discharge for cooling gas from said conductor bars is located well upstream of the entrance to said reverse flow fan.

6. A rotating electrical machine as in claim 1, said machine including circuit rings and a cooling gas flow path over said circuit rings.

7. A rotating electrical machine comprising a reverse flow cooling system, a rotor, a stator core having a center discharge duct and a stator end region cooling arrangement with a series-parallel cooling gas path through stator end region components, wherein said stator end region components include conductor bar sections with baffles coupled thereto for directing a cooling gas through said conductor bar sections, and an apertured plate for splitting the cooling gas into a first portion directed by said baffles in a series path through said conductor bar sections and a second portion passing through said aperture for mixing with said first portion at a point downstream in said conductor bar sections.

8. A rotating electrical machine as in claim 7 and further comprising a reverse flow fan located axially inboard with respect to stator conductor bars.

9. A rotating electrical machine comprising a reverse flow cooling system, a rotor, a stator, a plurality of circuit rings, and a stator end region cooling subsystem, said stator end region cooling subsystem including an apertured plate disposed between a cooling gas path and the stator end region, wherein at least one aperture of said apertured plate is disposed in a flow path defined by said circuit rings.

10. A rotating electrical machine comprising,
 a stator and a rotor,
 a reverse flow cooling system, and
 a stator end region cooling subsystem with a series-parallel cooling gas flow path through stator-end region components, wherein said series-parallel cooling gas flow path is comprised of a first series path through conductor bars and a second path parallel to and separate from an upstream portion of said first series path and a combined downstream path, and wherein said first path is defined by gas flow across said conductor bars and past a plurality of baffles, and said second path is defined by gas flow through an apertured plate upstream of said conductor bars.

* * * * *